(12) United States Patent
Zwirner et al.

(10) Patent No.: US 8,423,976 B2
(45) Date of Patent: Apr. 16, 2013

(54) EXTREME PIPELINE AND OPTIMIZED REORDERING TECHNOLOGY

(75) Inventors: Eric W. Zwirner, Dayton, OH (US); Gregory P. Crocker, Miamisburg, OH (US); Joshua C. Kennel, Hamilton, OH (US); Timothy R. Hoerig, Beavercreek, OH (US); William J. Cannon, Centerville, OH (US)

(73) Assignee: Northrop Grumman Corporation, Redondo Beach, CA (US)

( * ) Notice: Subject to any disclaimer, the term of this patent is extended or adjusted under 35 U.S.C. 154(b) by 247 days.

(21) Appl. No.: 10/388,301

(22) Filed: Mar. 13, 2003

(65) Prior Publication Data

US 2004/0181785 A1 Sep. 16, 2004

(51) Int. Cl.
*G06F 9/45* (2006.01)
(52) U.S. Cl.
USPC .......................................................... 717/136
(58) Field of Classification Search .................. 717/136, 717/137
See application file for complete search history.

(56) References Cited

U.S. PATENT DOCUMENTS

| | | | |
|---|---|---|---|
| 5,875,318 A | 2/1999 | Langford | |
| 6,041,402 A | 3/2000 | Cannon et al. | |
| 6,212,614 B1 | 4/2001 | Hoerig et al. | |
| 6,223,339 B1 | 4/2001 | Shah et al. | |
| 6,272,453 B1 * | 8/2001 | Hoerig et al. | 703/27 |
| 6,314,560 B1 | 11/2001 | Dunn et al. | |
| 6,502,237 B1 | 12/2002 | Yates et al. | |
| 6,711,672 B1 * | 3/2004 | Agesen | 712/227 |
| 2001/0008023 A1 * | 7/2001 | Bond et al. | 717/8 |

FOREIGN PATENT DOCUMENTS
DE 19617842 11/1997

OTHER PUBLICATIONS

Cifuentes et al., "The design of a resourcable and retargetable binary translator", Oct. 1999, IEEE Reverse Engineering Proceedings Sixth Conference on Digital Object Identifier, p. 280-291.*
"Advances and Future Challenges in Binary Translation and Optimization" by Altman, et al., *Proceedings of the IEEE*, vol. 89, No. 11, Nov. 2001, pp. 1710-1722.
"Digital FX!32: Combining Emulation and Binary Translation" by Hookway, et al., *Digital Technical Journal*, vol. 9, No. 1, 1997, pp. 1-12.
"PA-RISC to IA-64: Transparent Execution, No Recompilation" by Zheng, et al., *Computer Magazine*, vol. 33, Mar. 2000, pp. 47-52.
"Digital FX!32 Running 32-Bit x86 Applications on Alpha NT", by R. Hookway, IEEE *COMPCON 97 Proceedings*, Feb. 23-26, 1997, San Jose. California, pp. 37-42.
"The Alpha 21164PC Microprocessor" by Bannon, et al., *IEEE COMPCON 97 Proceedings*, Feb. 23-26, 1997, San Jose, California, pp. 20-27.

(Continued)

*Primary Examiner* — Philip Wang
(74) *Attorney, Agent, or Firm* — John S. Paniaguas; Katten Muchin Rosenman LLP

(57) ABSTRACT

The present invention relates to a binary translator for directly translating binary instructions written for a legacy processor to executable binary instructions for a native processor. In accordance with an important aspect of the invention the binary translator is configured as a reconfigurable translator, which enables the binary translator to be used with different legacy processors and/or operating systems and native processors. The binary translators also optimize to take advantage of more efficient native processor instructions and allows portions of the legacy binary code to be disabled and/or new native instructions to be added to the application program without modification of the legacy binary code.

8 Claims, 12 Drawing Sheets

OTHER PUBLICATIONS

"Emulation Software R&D WWW Page", http:/www.uruk.org/emu/main.html, Jul. 4, 1997.

"Binary Emulation in NetBSD", http:/user.fundy.net/david/binem.html, 1999.

"What is Binary Translation?", http:/www.uruk.org/emu/gorton.txt, Oct. 18, 1995.

"Binary Translation", http:/www.uruk.org/emu/Binary_Translation_01apr1993DTJ809SC.txt, Apr. 1, 1993.

Altman et al.: "Advances and Futures Challenges in Binary Translation and Optimization" Proceedings; Proceedings of TE IEEE, vol. 89 No. 89 No. 1-; Nov. 2001: pp. 1710-1722.

Raymound J. Hookway &. Mark A. Herdeg: "Digital FXI32: Combining Emulation and Binary Translation"; Digital Technical Journal vol. 9- Nov. 1, 1997: pp. 1-12.

Cindy Zheng & Carol Thompson: "PA-RISC to IA-64: transparent execution, no recompilation"; Hewlett-Packard Co., USA; Computer vol. 33- Mar. 2000: pp. 47-52.

Raymound Hookway: "Digital FXI32 running 32-Bit ×86 applications on Alpha NT" Digital Equipment Corp.; Compcon '97, Proceedings, IEEE Feb. 23, 1997-Feb. 26, 1997, Feb. 23-26, 1997 San Jose, CA, USA: pp. 37-42 Feb. 23-26, 1997.

Peter Bannon & Yuichi Saito: "The Alpha 21164PC Microprocessor" Digital Equipment Corp.; 1063-6390/97- 1997 IEEE: pp. 20-27.

"Emulation Software R&D WWW": Last Updated: Friday 9:00 Jul. 4, 1997; pp. 1-2: Retrieve from the Internet: URL:http://www.uruk.org/emu/main.html retrieved on Feb. 16, 2003!.

"Binary Emulation in NetBSD": Copyright 1999 The NetBSD Foundation, Inc.: pp. 1-3: Retrieve from the Internet URL:http//user.fundy.net/david/binem.html retrieved on Feb. 16, 2003!.

"FreePort Express technical Info": At SunWorld '95, Digital announced FreePort Express, a SPARC SunOS to Alpha OSF/1 Binary Translator: Oct. 18, 1995: pp. 1-7: Retrieved from the Internet: URL://www.uruk.org/emu/gorton.txt.

"Binary Translation": Digital Technical Journal vol. 4 No. 4 Special Issue 1992: pp. 1-18: Retrieved from the Internet URL://www.uruk.org/emu/Binary_Translation_01apr1993DTJ809SC.txt.

Cifuentes C. et al.: "Binary Translation: Static, dynamic retargerable?" Software Maintenance 1996, Proceedings., International Conference on Monterey CA, USA Nov. 4-8, 1996, Los Alamitos, CA, USA, IEEE Comput. Soc, US, Nov. 4, 1996 XP010204479 ISBN: 0-8186-7677-9: pp. 340-349—Abstract (p. 345, left-hand column, line 7-p. 347, right-hand column, line 5: figures 3,4).

Cristina Cifuentes: "Reverse Compilation Techniques" Jul. 1994, Faculty of Information Technology, Queensland University of Technology, Queensland, XP002279761: p. 28 (last paragraph)—p. 29 (paragraph 5): Retrieved from the Internet URL://research.sun.com/people/cristina/decompilation-publication.html.

David Ung & Cristina Cifuentes: "Machine-Adaptable Dynamic Binary Translation" Proceedings of the ACM Sigplan workshop on Dynamic and Adaptive Compilation and Optimization, 'Online! Jan. 2000, pp. 30-40, XP002279759 Boston, USA: p. 30 (right-hand column, line 22 line 24): Retrieved from the Internet: URL:http//research.sun.com/people/cristina/binary translation-publication.html retrieved on Apr. 10, 2004!

Cristina Cifuentes, Brian Lewis & David Ung: "Walkabout—A Retargetable Dynamic Binary Translation Framework" Technical Report TR-2002-106, Sun Microsystems Laboratories, 'Online! Jan. 2002, Xp002279760 Retrieved from the Internet:: p. 1(line1)—p. 2(line 3) URL://research.sun.com/people/cristina/binary translation-publications.html retrieved on May 10, 2004!

Cifuentes C et al.: "The design of a resourceable & retargerable binary translator" Reverse Engineering, 1999. Proceedings. Sixth working conference on Atlanta, GA, USA Oct. 6-8, 1999, XP010360118 ISBN: 0-7695-0303-9: pp. 280-291 (p. 281, right-hand column, line 28—p. 283, right-hand column, last line).

Ebcioglu et al.: "DAISY: Dynamic Compilation for 100% Architectural Compatibility," ACM, Jun. 2, 1997, pp. 26-37 (abstract).

Sites et al: "Binary Translation," Communications of the ACM, vol. 36, No. 2, Feb. 1, 1993, pp. 69-81 (p. 70, left-hand column, line 9—middle column, line 20).

EPO Search Report, Oct. 11, 2011.

* cited by examiner

| 1000 | ADDL | $t0,$t4,$t7 |
| 1004 | BIS | $t4,$t2,$a0 |
| 1008 | SRA | $t2,$v0,$a2 |
| 100C | BEQ | $ra,+8 |
| 1010 | ORNOT | $a3,$t0,$t4 |
| 1014 | ADDQ | $s0,$t4,$1 |
| 1018 | ADDL | $t0,$t4,$t7 |

◄——— Replace BEQ with a compare

◄─► Predicate these instructions

EXTREME PIPELINE AND OPTIMIZED REORDERING TECHNOLOGY

BACKGROUND OF THE INVENTION

1. Field of the Invention

The present invention relates to a binary translator for directly translating binary code of a legacy processor to executable binary code for a native processor and more particularly to a binary translator formed as reconfigurable translator that is suitable for use with different legacy processors and/or operating systems as well as different native processors in which the legacy code may be translated statically, dynamically or just in time and allows new code to be inserted or portions of the legacy code to be disabled without modification of the legacy binary code.

2. Description of the Prior Art

It is known that microprocessors are configured with different instruction set architectures (ISA). The ISA determines the instruction set for a particular microprocessor. Application programs to be executed by a microprocessor are normally written in a relatively high level language known as source code, for example in C or C++ and compiled into machine instructions compatible with the instruction set for a specific microprocessor. The machine instructions are known as binary code, object code and executable code.

Due to the age and obsolescence of many existing microprocessors and their corresponding slow speed, it is often desired to replace outdated existing microprocessors, hereinafter referred to as "legacy microprocessors", and "legacy processors", with newer faster microprocessors, herein referred to as "native microprocessors" or "native processors". Unfortunately, depending on the upgrade, the instruction set of the native processor is often times incompatible with the instruction set of the legacy processor. As such, various techniques have been developed to enable application programs written for legacy processors to be utilized on newer native processors. For example, software emulators are known. Such software emulators are based upon emulation of the various machine code instructions of a legacy processor used in an application program. Such emulators are known to include software handlers formed from one or more native instructions to accomplish the same function as the legacy instruction being emulated. Examples of such instruction emulator systems are disclosed in commonly owned U.S. Pat. Nos. 6,041,402; 6,212,614; and 6,272,453 as well as commonly owned U.S. patent application Ser. No. 10/382, 598, filed on Mar. 6, 2003, entitled "Direct Instructions Rendering Emulation Computer Technique", now U.S. Pat. No. 7,219, 337, issued on May 15, 2007.

There are several reasons why a binary translator may be needed. First, the legacy source code may not be available to facilitate a software port to a modern computer architecture. Secondly, the software overhead associated with traditional emulation systems slows the processing speed down considerably. Binary translation, then, is the only feasible choice for legacy code reuse on a newer, incompatible hardware platform.

Such binary translators translate the binary code of a legacy processor directly into binary instructions of a native processor. Examples of such binary translators are disclosed in U.S. Pat. Nos. 6,223,339; 6,314,560; and 6,502,237. Binary translators are also disclosed in; "DIGITAL FX!32 Running on 32-bit x86 Applications on Alpha NT, by R. Hookway, *Digital Equipment Corporation* Compcon '97 proceedings, IEEE, Feb. 23-26, 1997, San Jose, Calif., pages 37-42; "Advances and Future Challenges in Binary Translation and Optimization", by Altman et al., Proceedings of the IEEE, Vol. 89, no. 11, November 2001, pages 1710-1722; Ditigal FX!32: Combining Emulation and Binary Translation, by Hookway et al. Digital Technical Journal, Vol. 9, No. 1, 1997, pages 1-12; "PA-RISC to IA-64: Transparent Execution, No Recompilation, Zheng, et al., *Computer Magazine*, pages 47-52, Vol. 33, March 2000.

Although the known binary translators are able to effectively translate legacy binary code to native binary code without modifying the legacy binary code, there are problems associated with such known binary translators. For example, most known binary translators are developed for a single legacy/native processor and operating system combination. Thus, application programs running on different legacy processors and/or native processors will require separate translators. In addition, such known translators do not allow for the addition of new native code written in a modern programming language for the purpose of disabling portions of the legacy code or enhancing it without needing to re-compile the program, which would require access to the original source code. Thus, there is a need for a binary translator for translating legacy binary instructions to native instructions that is suitable for use with multiple legacy processors and native processors and/or operating systems and can be modularly optimized at both the legacy and native instruction level and allows for adding new native code without recompiling the legacy program.

SUMMARY OF THE INVENTION

The present invention relates to a binary translator for directly translating binary instructions written for a legacy processor to executable binary instructions for a native processor. In accordance with an important aspect of the invention, the binary translator is a reconfigurable translator, which enables the binary translator to be used with different combinations of legacy processors and/or operating systems and native processors. The binary translator is also optimized to take advantage of more efficient native processor instructions and features, when available, and allows portions of the legacy binary code to be disabled and/or new native instructions to be added to the application program without modification of the legacy binary code.

BRIEF DESCRIPTION OF THE DRAWINGS

These and other advantages of the present invention will be readily understood with reference to the following specification and attached drawing wherein.

DETAILED DESCRIPTION

Figure 1:
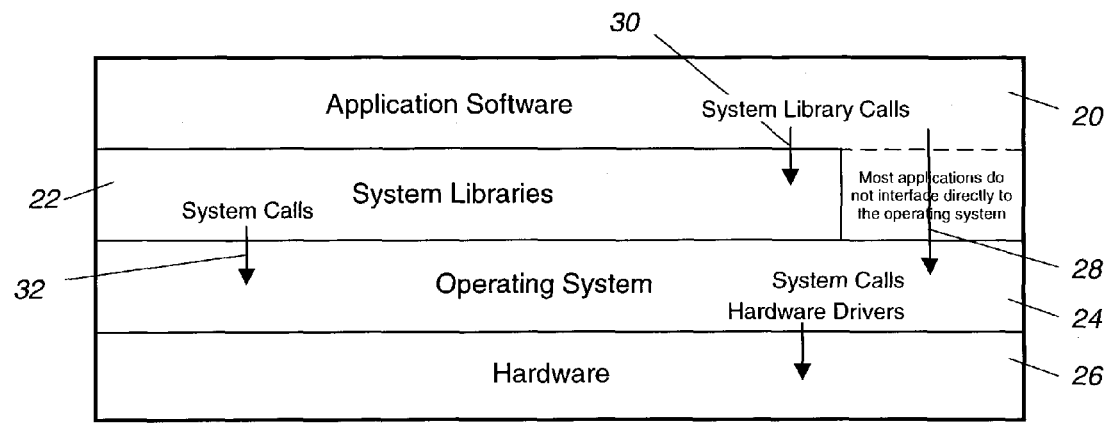
FIG. 1 is a block diagram of an exemplary software model, which illustrates how an application program interacts with the system operating system and processor.

The present invention relates to a binary translator formed as a reconfigurable translator, which enables binary instructions of a legacy microprocessor to be directly converted to binary instructions of a native processor. Direct conversion of binary instructions of the legacy processor results in native binary instructions, which generally execute considerably faster than emulated legacy instructions. In addition, in accordance with an important aspect of the invention, the system can be reconfigured for use with multiple native processors, multiple legacy processors and operating systems. In order to further enhance the flexibility of the translated native program, thunk objects may be used to disable portions of the legacy binary instructions and/or insert new native instructions without altering the original legacy binary code. As will be discussed in more detail below, the binary translator in accordance with the present invention translates legacy binary instructions to native binary instructions by first grouping the legacy instructions into contiguously executing code sections, applying algorithmic optimizations and then translating the binary, instruction by instruction to the native instruction set. Upon the completion of instruction translation, native optimizers can also be executed, if desired. Depending on the native processor, the native binary instructions may be reordered and/or grouped to take full advantage of the available processor resources. The resulting native binary is thus able to execute unassisted on the native platform.

Binary translators in accordance with the present invention operate in three different modes of operation: a static translation mode in which translation is done offline to generate a new executable binary of native instructions; a dynamic translation mode in which the translations are made while the legacy binary is loaded into the native processor memory; and a just in time translation mode in which the legacy instructions are translated only if and when they are needed on the first time they are executed.

Although the binary translator in accordance with the present invention is formed as a reconfigurable translator which can be configured for use with various legacy and native processors, an exemplary embodiment of the invention is an Alpha 21264 microprocessor with a Tru64 Unix operating system and an Intel IA-64 native processor with a Linux operating. Both the Alpha 21264 and IA-64 microprocessor architectures are 64-bit platforms. The Alpha 21264 microprocessor is a reduced instruction set computer (RISC). Microprocessors configured with a RISC architecture generally perform all operations in registers. Load and store instructions are used to fetch data into registers and save the results back to memory. For this reason, RISC architectures are known as "load/store" architectures. RISC architectures also eliminate complex instructions to reduce the complexity of the hardware. Modern software design paradigms promote the use of high order languages and compilers generally do not make use of complex instructions.

The Intel IA-64 microprocessor employs a relatively new design paradigm called explicitly parallel instruction computer (EPIC). The EPIC architecture dictates that scheduling instructions for optimal performance is to be done by the compiler (or assembly language programmer) and not the microprocessor hardware. IA-64 processors employ features to eliminate or reduce areas of processor performance problems. For example, such IA-64 processors include relatively large register sets; the ability to eliminate short forward branches; and a relatively large number of execution units to promote parallel code execution. The IA-64 microprocessor includes a growing family of microprocessors. The description below relates to a type IA-64 processor known as the Itanium 2.

Application Software Model

Referring to FIG. 1, a hierarchical model for a modern software application is shown. The model includes an application software layer 20; a system library layer 22; an operating system layer 24; and a hardware layer 26. Modern software application programs 20 are normally written to run on a particular microprocessor architecture and operating system. As shown, the application software 20 uses the services of the microprocessor operating system 24 as well as a set of system libraries 22 to perform common tasks. In particular, the application software may directly invoke operating system calls, as indicated by the arrow 28, but more commonly interfaces by way of system library calls to the system library layer 22, as indicated by the arrow 30. The system libraries 22, in turn, typically invoke system calls to the operating system layer 24 as indicated by the arrow 32. For example, a standard C/C++ system library layer 22 includes the ability to manipulate disk files using C functions. These functions, in turn, interact with the operating system through system calls. As will be discussed in more detail below, the binary translator in accordance with the present invention interfaces with the underlying operating system and does not require that the legacy and native operating systems be the same.

Binary Translator Subsystem

Figure 3:
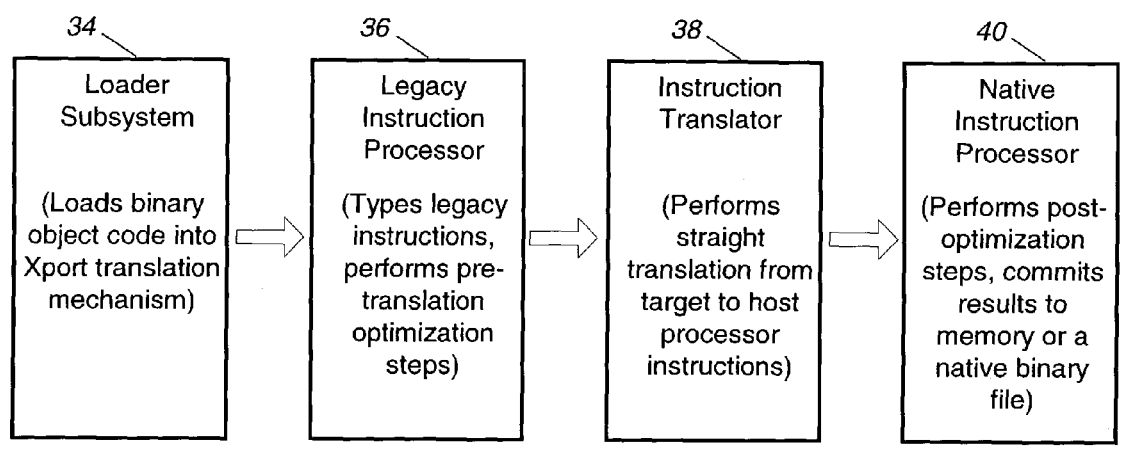
FIG. 3 is a block diagram of the binary translator in accordance with the present invention illustrating its various subsystems.

Referring to FIG. 3, the binary translator in accordance with the present invention is formed from four modular and reconfigurable subsystems: a loader subsystem 34; a legacy instruction processor subsystem 36; and instruction translator subsystem 38; and a native instruction processor subsystem 40. Each of the subsystems 34, 36, 38 and 40 are modular objects written in C++, for example. As such, any of the subsystem 34, 36, 38 and 40 can be designed around either a particular native processor architecture, a legacy processor architecture, or both. As such the binary translator in accordance with the present invention is reconfigurable in that it can be configured for any legacy or native processor unlike known binary translators configured for a particular legacy/native processor combination.

A detailed discussion of each of the subsystems is provided below. However, in general, the loader subsystem 34 reads the legacy code and data sections from the legacy binary file. The legacy instruction processor subsystem 36 categorizes the legacy instructions and breaks down the legacy program into legacy procedures. In addition, any pre-translation optimization modules are invoked if they are present and active. The instruction translator subsystem 38 translates the legacy instructions into native instructions. The native instruction processor subsystem 40 invokes post translation optimization modules, if any, and writes the resulting completely translated program to the native processor memory or disk file for later execution.

Figure 9:
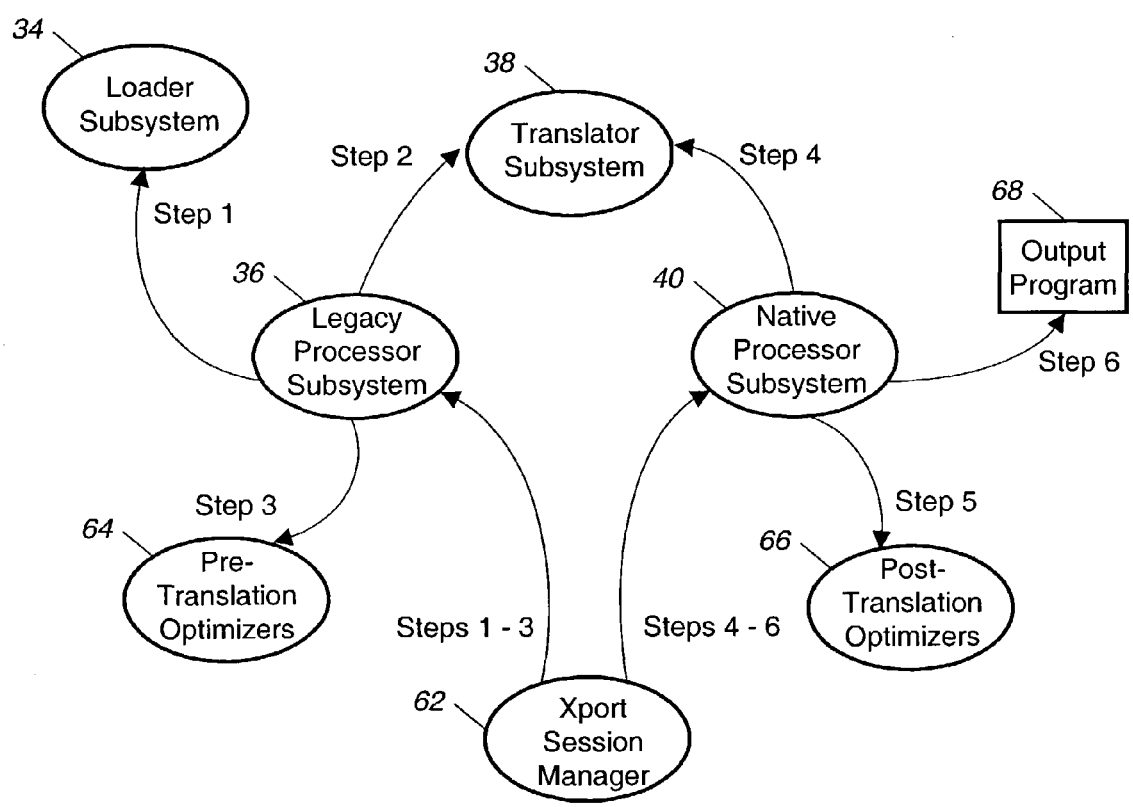
FIG. 9 is a process diagram for the binary translator in accordance with the present invention.

The binary translator in accordance with the present invention additionally allows code optimization modules to be plugged into either subsystem 36 or 40 to further increase the performance of the system. With reference to FIG. 9, these modules are identified with the reference numerals 64 and 66. Any number of optimization modules may be present which may operate on either the pre-translated legacy code, the post-translated native code, or some combination thereof. Optimization modules may be defeated if desired.

Figure 2:
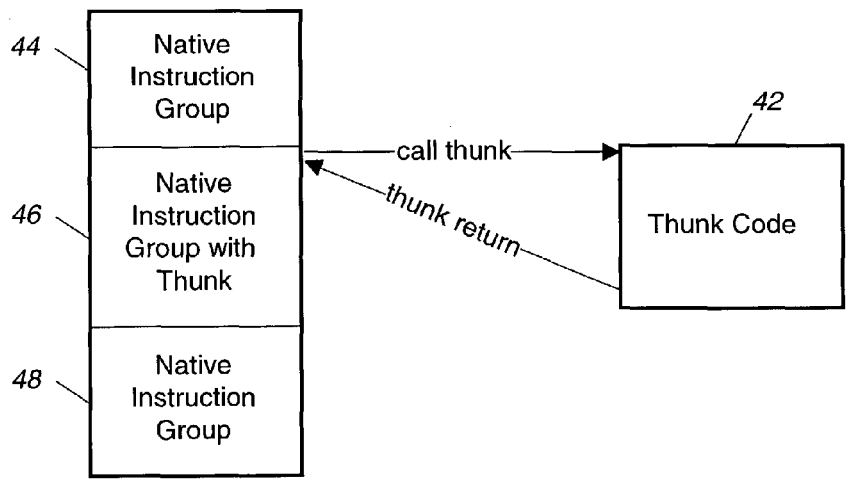
FIG. 2 is a block diagram, which illustrates a thunk process for inserting binary instructions into a native instruction group in accordance with one aspect of the present invention.

The binary translator in accordance with the present invention also allows for inserting new native code into the translated legacy code stream. These new native code segments are called "thunks". A thunk 42 is illustrated in FIG. 2. These thunk objects 42 can be used to add features without modifying the existing legacy binary code for various purposes, such as to add new features or to disable portions of the original legacy code. As shown in FIG. 2, three blocks of native instruction groups 44, 46 and 48 are illustrated. The thunk code is inserted by way of a vector from the native instruction codes 44 to the thunk object 42. The thunk code within the thunk object 42 is executed. Upon completion of execution of the thunk code, the system vectors back to the native instruction groups as shown in FIG. 2.

Loader Subsystem

As mentioned above, the loader subsystem 34 reads the legacy binary file and extracts the legacy code and data sections. The loader subsystem 34 is a pluggable system that can be adapted to numerous file formats. For the exemplary legacy processor and operating system mentioned above, exemplary loaders include Linux executable linkable format (ELF) and Tru64 Unix Common Object File Format (COFF).

Figure 4:
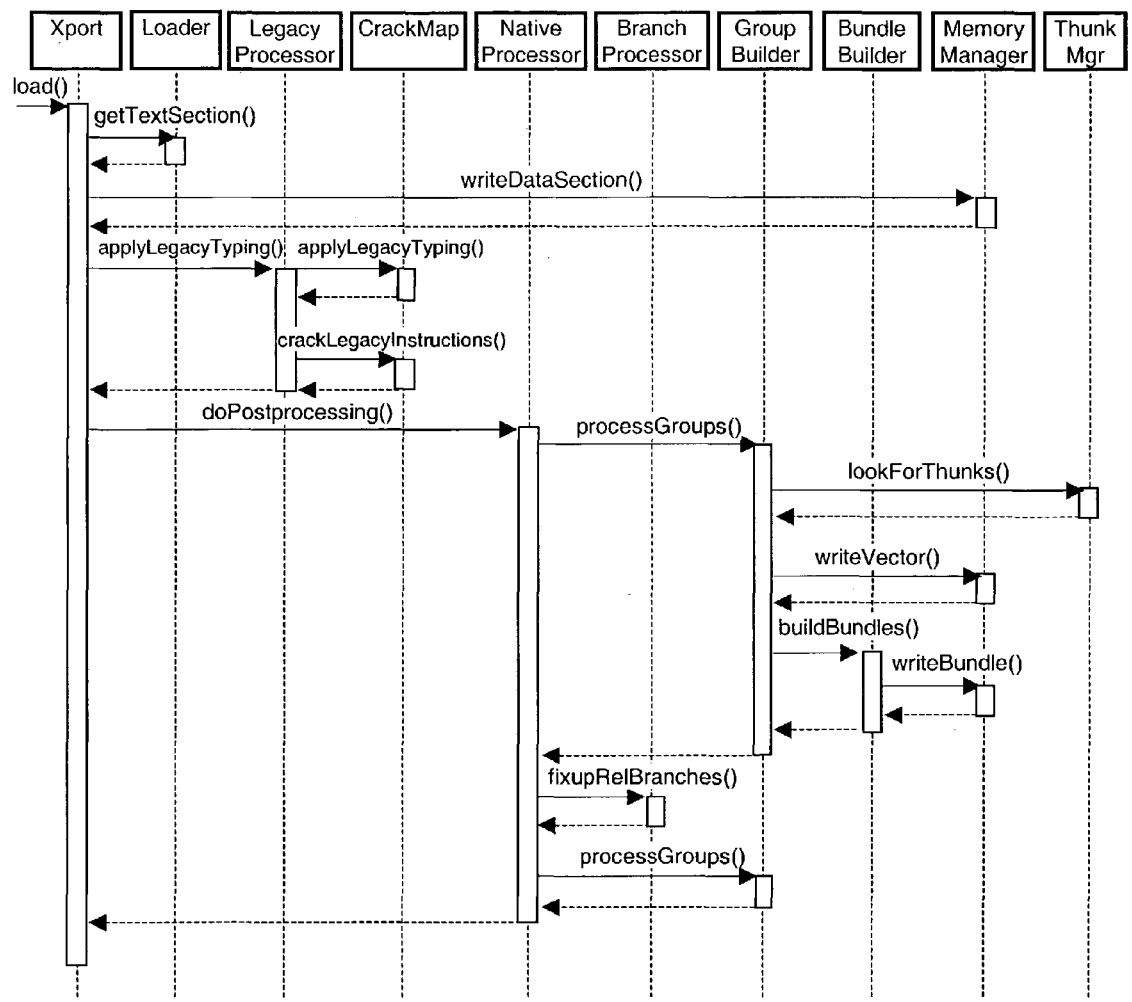
FIG. 4 is an exemplary loader sequence diagram for translating an exemplary legacy Alpha 21264 microprocessor application written for a Tru64 Unix operating system for use on a native Intel IA-64 processor running a Linux operating system.

The loader subsystem 34 interfaces to the balance of the binary translator through only a few interfaces. FIG. 4 illustrates an exemplary unified modeling language (UML) sequence diagram for use in a translation of instructions of a Alpha legacy microprocessor with a Tru64 operating system to a Intel IA-64 microprocessor with an Linux operating system.

Legacy Instruction Processor Subsystem

The legacy instruction processor subsystem 36 analyzes the legacy instructions, types them according to their general function and breaks the instructions down into functional blocks of legacy code. Before the legacy instruction processor subsystem 36 releases control, it can call any desired legacy optimizers that are available and activated. The legacy instruction processor subsystem 36 is independent of the native processor on which the system is running.

The legacy instruction processor subsystem 36 breaks down the legacy program into segments called legacy procedures. A legacy procedure is a segment of legacy instructions that end with a legacy flow control instruction, such as a branch instruction. Each legacy instruction is placed within a container object, called a "LegacyInstruction". The LegacyInstruction objects are stored in a "LegacyProcedure" object. As will be discussed in more detail below, at a later stage, "NativeInstructions" are added to the LegacyProcedure object.

Each LegacyInstruction object contains the legacy binary instruction as well as information about the instruction including its overall type and how to convert it to a native processor instruction. The container objects are then available to the other subsystems for use in translation and optimization. All of the legacy procedure objects are contained in a LegacyProgram object.

The legacy instruction processor 36 is a modular subsystem and can be reconfigured to provide compatibility with a different legacy processor. This may be accomplished through C++ object oriented techniques. Base classes exist to define the required interfaces.

After grouping and typing the legacy instructions, the legacy processor subsystem 36 invokes any desired pre-translation optimization modules before exiting and a number of optimization modules can be selected for execution. A pre-translation optimization module works with the legacy instructions and may disable them, augment them, or work in conjunction with the post-translation optimizer to produce better performing code.

Instruction Translator Subsystem

The instruction translator subsystem 38 performs translation from legacy processor instructions to native processor instructions. This subsystem 38 is dependent on the legacy and native processor architectures. This subsystem 38 is called from other subsystems and contains an instruction translation object that performs two major functions as follows:

Instruction Typing. The legacy instruction processor 36 uses instruction typing to type legacy instructions. This mechanism indicates to the legacy instruction processor when it encounters a legacy flow control instruction and provides typing information that may be required by pre-translation optimizers.

Instruction Translation. The native instruction processor subsystem 36 uses this service to generate native processor instructions that perform operations required by the legacy instructions.

The instruction translator subsystem 38 is ultimately responsible for performing all legacy to native instruction translation.

In an exemplary embodiment of the invention in which binary instructions of Alpha legacy microprocessor are translated into suitable binary instructions for an Intel IA-64 microprocessor, the instruction translator subsystem 38 may be implemented with a series of C functions—one for each Alpha legacy instruction to produce the required IA-64 native microprocessor instructions. These C functions are hereafter known as legacy instruction translators. Additionally, a series of C functions, one for each of the required IA-64 legacy native processor instructions may be used from within the legacy instruction translators. These C functions are hereinafter referred to as native instruction generators.

Native Instruction Processor Subsystem

The native instruction processor subsystem 40 requests translation of legacy instructions to native instructions; invokes any desired native instruction optimization modules; and writes the translated binary code to the native processor memory or to a file to be run at a later time.

Native instruction objects are used to hold the native instructions required to duplicate the behavior of the legacy procedure. The number of native instruction objects required for a legacy procedure may or may not match the number of legacy instruction objects because the number of native instructions required to duplicate the behavior of a legacy instruction varies. All of the native instruction objects are, in aggregate, the instruction portion of the translated binary program.

The native instruction processor subsystem 40 is completely configurable to enable the legacy binary to execute on a variety of different native processors. This subsystem 40 is independent of the legacy processor being used.

As mentioned previously, instruction translation by way of the instruction translator subsystem 38 is invoked by the native instruction processor subsystem 40. This process involves populating the already created legacy procedure objects with some number of native instruction objects, which contain the translated host processor instructions. Native instructions are not committed to memory or file at this point since post-translation optimizers may modify the native instruction mix.

After each legacy instruction has been translated into one or more native processor instructions, any post-translation optimizers that are present are invoked. These pluggable modules can be activated or deactivated.

Translation Process

As mentioned above, the legacy program is broken down into legacy procedures that end with a legacy flow control instruction. This allows for processing multiple instructions simultaneously for better-optimized code. For instance, the Intel IA-64 architecture allows for executing up to six instructions per clock cycle. Processing multiple instructions at once allows for determining what instructions are safe for parallel execution based on data dependencies. As a result, the native instructions generated for a legacy instruction segment or procedure may not perform the operation in exactly the same order as the legacy processor. However, this is not problematic so long as the data dependencies are respected. Executing Intel Type IA-64 instructions one at a time, however, does not take full advantage of the processor's execution resources.

Figure 5:
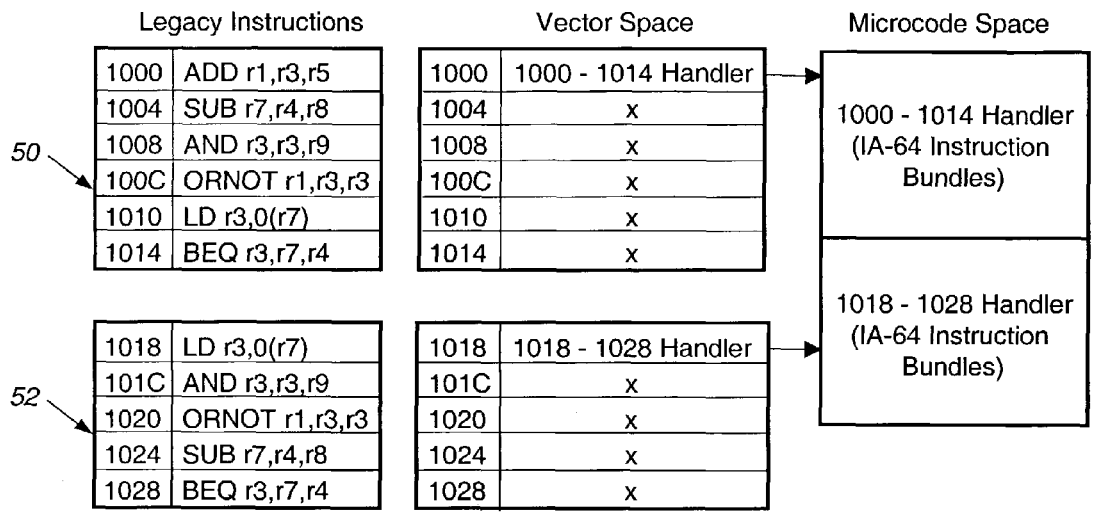
FIG. 5 is an exemplary memory map illustrating the relationship between an exemplary legacy code segment and vector space.

The binary translator in accordance with the present invention uses a vector table or space, which contains a 64-bit value for each legacy instruction. The 64-bit values are full addresses of where the native instruction handler is for that instruction. However, not every instruction will contain a valid vector entry since the legacy program is broken down into legacy code segments ending in legacy flow control instructions. Since the binary translator in accordance with the present invention works with contiguously executing legacy code blocks or segments, a vector is only required for the start of each corresponding legacy code segment (or legacy procedure). The vector is the address of the native instruction handler for that legacy procedure. For example, FIG. 5 illustrates two groups of legacy instructions, identified with the referenced numerals 50 and 52 and their addresses. Each group 50, 52 of instructions ends with a branch instruction BEQ which forms a legacy code segment (or legacy procedure). Each legacy address has a corresponding location in the vector space. In turn, each populated entry in the vector space points to a native instruction handler in the microcode space. In accordance with one aspect of the invention, the binary translator uses a two-pass translation system when dealing with branch instructions. More specifically, for many legacy branch instructions, it is possible to determine the branch destination directly from the legacy code. Other times the destination code cannot be directly determined. The binary translator in accordance with present invention can deal with both situations.

The first pass of the translation produces native instructions for all legacy instructions except jumps or branches (i.e. flow control instruction). Once the first pass is complete, relative branch translation can be done since the vectors for the rest of the code have been generated. The second pass fills in the branch instructions for those branches whose destinations can be determined at translation time.

If a branch destination can be determined at translation time and that branch vectors to a location where there is no valid vector, a LegacyProcedure object is generated and populated with legacy instructions from that point forward until the legacy flow control instruction is found. For example, with reference to FIG. 5, if a branch ended up going to location 1020, a LegacyProcedure object would be created and translated for instructions at addresses 1020, 1024 and 1028. This process occurs during the second pass. Thus, the second pass completes all branch instructions for the destinations known at load time and builds new handlers for destinations that do not already have a valid vector.

Though the two-pass translation is able to handle many branch instructions, not all branch destinations are known at load time. Some branch instructions rely on destination addresses calculated at run time. In these cases, these branch instructions pull their native instruction handler address from the vector space and jump to that location. If there is no valid vector for the destination, a native instruction handler is dynamically created and its address is entered into the vector space. This process is done by dynamic cracking, which performs run-time translation of the legacy code starting at the branch destination address and continuing until a legacy flow control instruction is found. The dynamic cracking object creates a new LegacyProcedure object and populates it with LegacyInstruction objects for the legacy instructions through the next flow control instruction. It then requests the translation of the legacy instructions and commits the resulting native instructions to memory. This system can handle all branch instructions but is used as a last resort since precalculating branch destinations when possible allows for better performance.

Operating System Calls

As mentioned above, application programs are known to make operating system calls either directly or indirectly through a system library function. For example, the Alpha 21264 microprocessor architecture defines a system call as a specific instruction. The instruction, when executed, causes an operating system trap to occur. Prior to the system call instruction, the compiler and/or programmer must insert the system call number into a known register, $v0 in the case of the Alpha 21264 microprocessor. The system call number is extracted from $v0 and additional arguments may then be extracted from other registers as defined by the system's function calling conventions. To the binary translator, a system call is just another instruction. However the system call numbers can and do differ from operating system to operating system. As an example, the OpenVMS operating system uses different system call numbers than Tru64 Unix. The Windows NT operating system for Alpha is different from OpenVMS and Tru64 as well. Therefore, the binary translator system call must be specific to the legacy operating system.

Direct Match System Calls

The binary translator allows for mapping each system call to either a closely matching host processor system call or to code that emulates the behavior of the legacy system call with or without assistance of the native operating system. For example, an exemplary assembly language program for the Intel IA-64 microprocessor architecture for translating the remove disk directory (rmdir) Alpha Tru64 Unix system call- into an equivalent Intel IA-64 Linux system call is illustrated below:

```
/*
* SYS_rmdir
* Alpha 137 <---> IA-64 1056
*
* Inputs: r32 = char *pathname
* Outputs: int status
*/
.proc xport_SYS_rmdir
xport_SYS_rmdir:
    MapPreamble    r86,rTemp1,bSave1    // setup, save return address
    MakeIA64Addr   param0,a0            // setup first input
    mov            r15 = 1056           // setup the syscall number
    break          0x100000             // do syscall
    AdjustResults                       // fixup errno/indicator
    Return         bSave1               // done, return
.endp
```

The address of this stub is stored in a table and when the Alpha 21264 system call instruction is executed, the system call number placed in Alpha register $v0, is used as an index into the table. The address at that table location is used to branch to this stub. The stub moves the only required parameter (a pointer to a string containing the directory name) into the correct register on the Intel type IA-64 processor and places the IA-64 system call number (1056 instead of 137 for the Alpha microprocessor) into the register 15 for the Intel IA-64 microprocessor. The system call returns an indicator value, 0 for success or −1 for failure, which is placed into the correct register in the Alpha microprocessor. Another value, 'errno' (error number) indicates the reason for failure. That value is different between the Alpha/Tru64 system and the IA-64/Linux system and thus must be translated. The "AdjustResults" macro does this by way of another data table. Once translated, the errno value is placed into the correct Alpha register and the stub is ready to return back to regular code execution. The IA-64 break instruction with an argument of 0x100000 causes the system call to occur.

Non-Direct Match System Calls

The previous example illustrates a condition where there is an exact match to an existing host processor system call. However, this is not always the case. For instance, the Alpha/Tru64 Unix 'uname' system call returns information about the machine in the form of several text streams. The following example is an example of an assembly language stub for this system call.

```
/*
* SYS_uname
* Alpha 207 <---> IA-64 1130
*
* Inputs:  r32 = struct utsname *buf
* Outputs: int status
*/
.proc xport_SYS_uname
xport_SYS_uname:
    MapPreamble    r86,rTemp1,bSave1    // setup, save return address
    MakeIA64Addr   param0,a0            // setup first input (sysname)
    br.call.sptk.few b0 = callsysUname  // do as a C function
    cmp.eq         pTemp1,pTemp2 = 0,IA64Ret // was return
                                        value good?
    (pTemp1) mov   v0 = 0               // yes, fix up errno
    (pTemp1) mov   a3 = 0               //   and error indicator
    (pTemp2) mov   v0 = 14              // no, set errno to EFAULT
    (pTemp2) mov   a3 = −1              //   and error indicator to −1
    Return         bSave1               // done, return
.endp
```

The problem with mapping this system call directly is that the legacy program is not running on a processor for which it was originally designed. Therefore, this stub calls a C function rather than directly using the Intel IA-64 Linux 'uname' system call and adjusts the resulting strings.

The following example shows a C function used to redefine the behavior of the Linux 'uname' system call. Note that this function is called by the br.call.sptk.few instruction in the stub above.

```
/*
* This is a stub for the uname system call. Additional work must be
* done for two reasons: 1) the size of the strings in the utsname
* struct is different between IA-64/Linux and Alpha/OSF, and 2) we
* really don't want an Alpha/OSF program thinking it's running on
* IA-64/Linux.
*/
INT64 callsysUname (char *uts_alpha)
{
  struct utsname uts;
  // do the syscall, see if it works
  if (uname (&uts) < 0)
     return −1;
  // this doesn't work directly because the IA-64 utsname struct allows
  // for each string to be 64 bytes but the Alpha only allows for 32
  // ALSO--FAKE IT OUT TO LOOK LIKE THE ALPHA!
  strcpy (&uts_alpha [0], "OSF1");
  strcpy (&uts_alpha [32], uts.nodename);
  strcpy (&uts_alpha [64], "V5.1");
  strcpy (&uts_alpha [96], "732");
  strcpy (&uts_alpha [128], "alpha");
  return 0;
}
```

It is to be noted that the Linux 'uname' system call is used, but only the 'nodename' element is transferred to the native result. All other fields are fabricated to make the program believe it is running on a Tru64 Unix operating system, for example, version 5.1, build 732.

Through techniques like these, it is possible to recreate the entire system call set of the legacy operating system. The complexity of this task depends on the differences between the legacy and native operating systems. In the case of the Alpha microprocessor running on a Tru64 operating system to an Intel IA-64 microprocessor Linux operating system, there are many similarities.

System Library Replacement

As discussed above, system calls can be mapped to the host operating system. As mentioned above, legacy application programs also interface with system libraries. Depending on the legacy application, it may be possible to use the system libraries from the native microprocessor rather than the legacy libraries. This approach may be advantageous in that the native libraries are likely to be better optimized to execute on the native system. Where it is not possible, the legacy system library, in one form or another must be used.

Static vs. Dynamic linking

Software applications that use system libraries maybe statically linked or dynamically linked. For a static link, the code that the application requires from the library is brought into the resulting application binary load module. This creates a stand alone load module but is larger than a dynamic link, which loads the library code as needed. For dynamically linked applications, a shared library must be available when the program runs.

Statically Linked Application

If a legacy application is statically linked, it would likely not be possible to easily replace the statically linked legacy library code with native library code. Therefore, the legacy library code may be translated with the rest of the legacy application. The binary translator in accordance of the present invention will not know that the legacy library code is present. In this application, no additional legacy components are required to produce a completely translated native binary.

Dynamically Linked Application

For applications that use dynamic library linking, the load module must contain information about what library is required. Information about what functions are unresolved will also be present. At this point, it is often possible to use native libraries instead of legacy libraries. Whether or not this can be done depends on whether the same funcationality exists on the native system. If it does, a simple translation stub is used to move arguments into the correct registers since the function calling conventions between the legacy and host processors will likely differ. The code example below shows an example of a Intel IA-64 assembly language stub that allows for using the native 'atan' (arctangent) library function instead of the legacy library function.

```
// double atan (double x);
.proc atanXport
atanXport:
    MapPreamble     ra,rTemp1,bSave1           // Save IA64 return
                                                  addr in bSave1
    mov             fout0=fa0                  // Move arg0
    br.call.sptk.many  b0=atan                 // Call ia64 routine
    mov             LegacyFpRet=IA64FpRet      // Move IA64 return
                                                  value to legacy
    Return          bSave1                     // Return
.endp
```

As shown, very little code is required to map the Intel IA-64 'atan' library function to the Alpha version with the resulting performance increased from doing so being relatively substantial. However, this approach requires being able to recognize the legacy library function and knowing what arguments it requires. Therefore, it is suitable only for commonly used library functions and cannot be used for unknown legacy libraries.

An alternative to mapping the legacy function to a native function is to simply translate the legacy library. This obviously requires that the legacy library be available for translation. This process results in the same performance as the statically linked application but is more flexible than using native libraries since any available legacy library can be used whether its content functions are known or not.

Memory Layout

Figure 6:
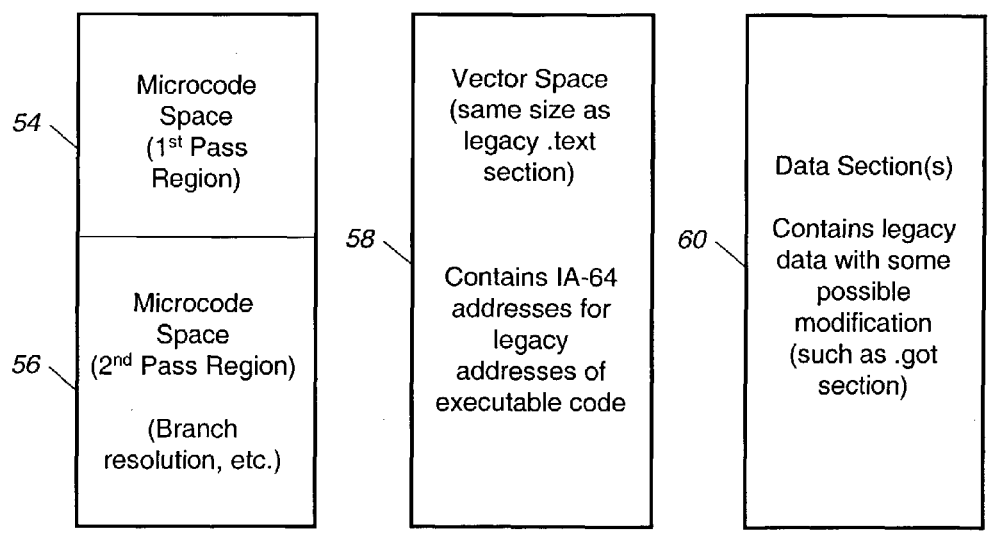
FIG. 6 is an exemplary diagram illustrating the memory layout for the binary translator in accordance with the present invention.

FIG. 6 is a graphical representation of the memory regions used in the binary translator in accordance with the present invention. The first two memory regions, identified with the referenced numerals 54 and 56, relate to the first pass and second pass microcode regions, as discussed above. These memory regions contain the translated native instructions that make up the translated legacy application. The next region, identified with the referenced number 58, relates to the vector space which contains the microcode addresses for each legacy instruction handler. As previously noted above, not all locations in the vector space 58 contain valid entries. The vector space 58 contains the same number of entries as the number of legacy code instructions. The final region is the data space 60. These are data sections that are defined in the legacy application load module. The data space 60 is only for static data or data that is explicitly defined in the load module. The legacy program may allocate additional memory out of the heap or free store as required.

Other memory regions may be provided to the translated legacy application as needed. These include a stack, which is allocated from the native processor memory pool and dynamically requested memory from the host processor heap or free store.

Another possible region, which may or may not be physically located in the host processor memory, is the legacy code. Once the translation is complete this information is not required except for the dynamic cracking operations, discussed above. In these cases, the information can be read from a disk file to save memory.

Register Layout

A primary factor in the performance of the binary translator in accordance with the present invention is its approach to native processor register usage. The information on how the binary translator in accordance with the present invention uses the native processor's registers for its execution of the legacy binary is provided below. This information can vary from native processor to native processor. The information below relates to an Intel IA-64 native processor and an Alpha 21264 legacy processor.

Legacy processor registers are mapped to native processor registers for performance reasons. Many modern microprocessor architectures perform nearly all of their operations exclusively in registers and are forced to load values from memory and then save the results back unnecessarily, resulting in a substantial performance penalty.

The Alpha 21264 processor has 32 64-bit general-purpose registers and 32 64-bit floating-point registers. The Intel IA-64 processor has 128 64-bit general-purpose registers and 128 80-bit floating-point registers. Register allocations for the Alpha/Tru64 legacy system and the IA-64 native system are provided below.

General registers 0-30 are stored in IA-64 general registers 32-62.

Alpha general register 31 always reads as zero and can be written to, but its value always reads zero. The IA-64 general register 0 has nearly the same characteristics so Alpha register 31 is mapped to IA-64 general register zero.

Alpha floating-point registers 0-30 are stored in Intel IA-64 floating-point registers 32-62.

Alpha floating-point register 31 always reads zero and can be written to but its value will always read zero. The IA-64 floating-point register 0 has nearly the same characteristics so Alpha floating-point register 31 is mapped to IA-64 floating-point register 0.

16 IA-64 general registers are designated as scratch pad or temporary registers, r63-r78.

16 IA-64 floating-point registers are designated as scratch pad or temporary registers, f63-f78.

16 IA-64 predicate registers are designated as scratch pad or temporary registers, p1-p16. Predicate registers are used to store single bit true/false results from compare operations. These registers can be used against the execution of nearly all IA-64 instructions to conditionally allow the IA-64 instructions to execute. There is no Alpha 21264 equivalent.

Two IA-64 branch registers are designated as scratch pad or temporary registers, b4-b5. Branch registers are used to hold destination addresses for branch instructions. The Alpha 21264 uses general-purpose registers for this function.

Binary Translator System Class Diagrams

Figure 7:
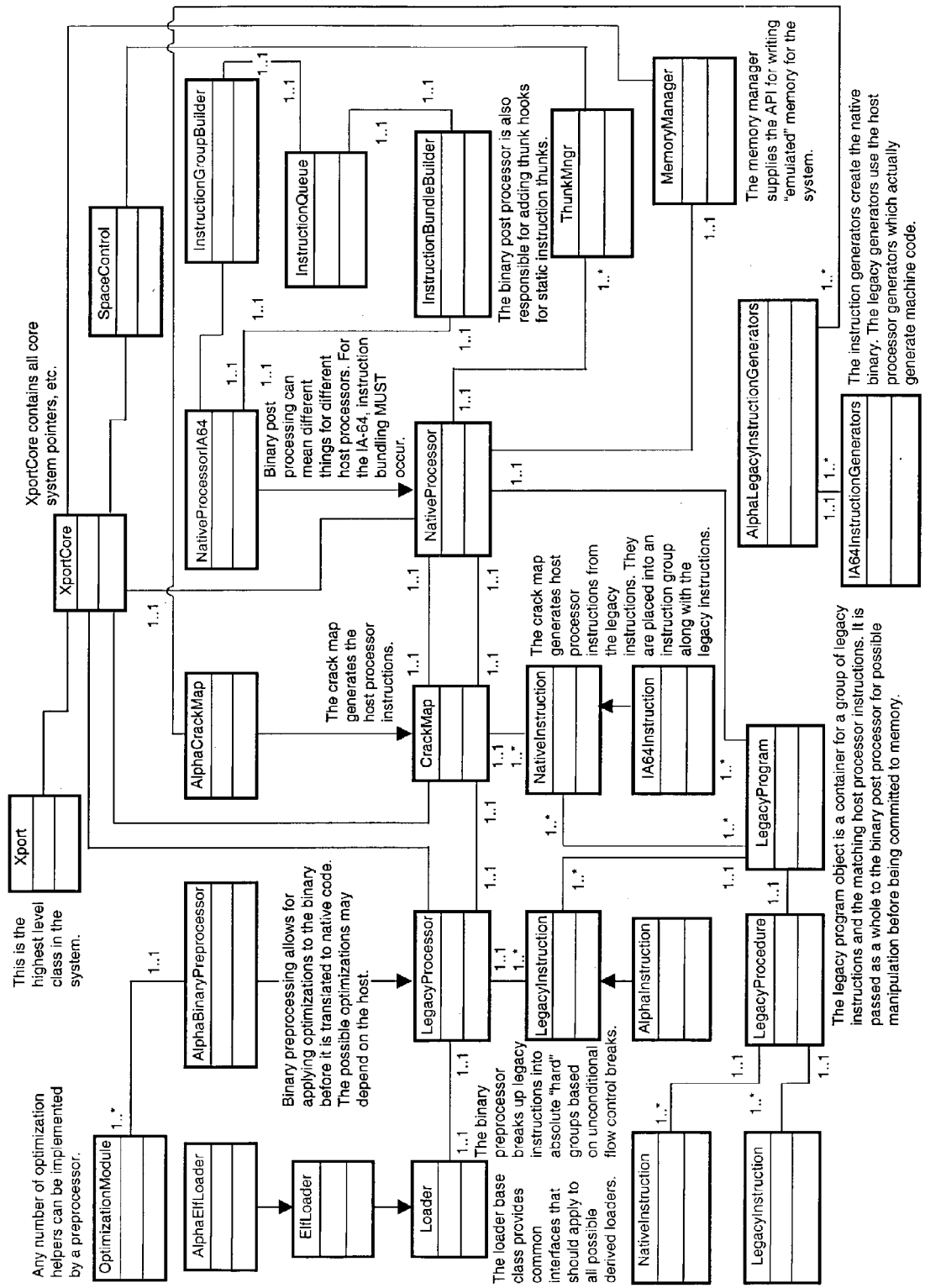
FIG. 7 is a class diagram for the binary translator in accordance with the present invention.
Figure 8:
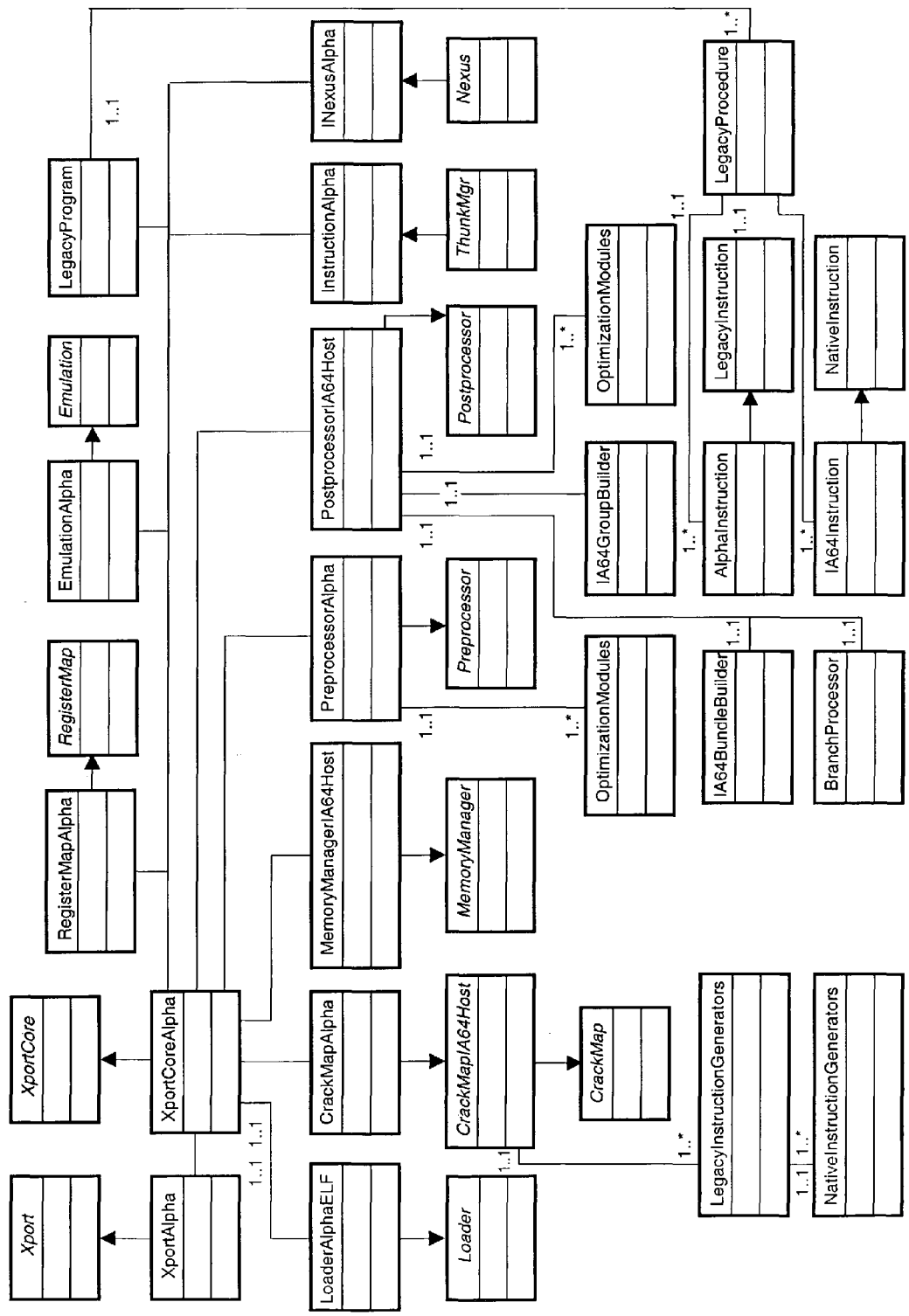
FIG. 8 is a hierarchical class diagram for the binary translator in accordance with the present invention.

UML class diagrams for the binary translator are illustrated in FIGS. 7 and 8. Major functional components are included along with brief descriptions. FIG. 7 is organized along the functional units of the binary translator and emphasizes the major systems. Not all classes are shown. Though not evident from the diagram, a set of C++ base classes forms the foundation of the binary translator. This set of classes is not geared toward any particular legacy or host processor. Another layer is used to integrate the native processor's specific information and the legacy processor's specific information.

FIG. 8 is organized in a hierarchal fashion and shows the top down organization of all classes. Not all classes of the binary translator are shown.

Translation Process Diagrams

FIG. 9 illustrates a translation process diagram. A binary translator session manager object 62 is at the top level of the translation process. It, in turn, invokes the legacy processor subsystem 36 and the native processor subsystem 40. Six overall steps are shown:

1. The loader subsystem 34 is used to load the legacy program. Legacy data segments are committed to memory unmodified. Legacy instructions are passed to the rest of the system for translation.

2. The legacy instructions are then typed and grouped into legacy instruction groups ending with flow control instructions. The output of this step is a series of LegacyProcedure objects, each of which contains the sum number of LegacyInstruction objects. The aggregate of these objects is the instruction portion of the legacy program.

3. Pre-translation optimization modules 64 are invoked if present and active. These modules operate on the LegacyProcedure and LegacyInstruction objects created in step 2.

4. The LegacyInstructions are translated into native processor instructions. The outputs of this step are NativeInstruction objects, which are added to each LegacyProcedure object. The aggregate of all native instruction objects is the instruction portion of the translated program.

5. Post-translation optimization modules 66 are invoked if present and active. These modules operate on NativeInstruction objects with possible use of LegacyProcedure and/or LegacyInstruction objects created in step 4.

6. The final step is to commit the translated program to either the native processor memory in preparation for execution or to a disk file for later use as indicated by the block 68 labeled "output program".

Instruction Translation Examples

Examples of the code used to translate several representative Alpha 21264 instructions into IA-64 instructions is provided below. The Alpha/IA-64 prototype uses an instruction translation mechanism that provides a C function for each legacy Alpha instruction, called legacy instruction translators and a C function for each IA-64 instruction, called native instruction generators. C functions are used because their addresses can be stored in a table for efficient access. The instruction translator examines legacy instructions, extracts the operation code, and pulls the address of the legacy instruction translator function for that Alpha instruction. The legacy instruction translator function, in turn, uses native instruction generators to produce IA-64 instructions as required. Two example Alpha instructions are explored.

Alpha S4 ADDQ, Literal Form

This instruction is an integer addition instruction used to add a literal value to a value already in a register. The first example below shows the legacy instruction translator for this Alpha instruction. The function calls two different IA-64 instruction generator functions, shladd, and adds_i14. These C functions produce the IA-64 binary instructions required to replicate the behavior of the Alpha S4 ADDQ instruction. After calling each IA-64 instruction generator function, the IA-64 instructions are added to the translator subsystem to await further processing before being committed to native processor memory and/or a disk file.

Legacy instruction translator functions are used by the Alpha to IA-64 translator to convert Alpha 21264 instructions to IA-64 equivalents. In this case, two IA-64 instructions were required. More or less may be needed for other legacy instructions. The second example below shows the IA-64 instruction generator functions required to produce the IA-64 'shladd' instruction.

---

Alpha S4ADDQ literal form instruction translator function.

```
/*
* This function translates the Alpha instruction Scaled Add
Quadword by 4.
* S4ADDQ multiplies Ra by 4 and adds it to lit. The 64-bit sum is
stored in Rc
*/
INT64 S4ADDQ_LIT (Translator *translator, UINT64 Ra,
UINT64 lit, UINT64 Rc)
{
    NativeInstruction instr;
    //Get the necessary temp registers
    UINT64 rTemp1 = translator->regMaps->getGPTempReg ( );
    //Get the mapped IA64 registers for the input Alpha registers
```

-continued

| Alpha S4ADDQ literal form instruction translator function. |
|---|
| ```
Ra = translator->regMaps->getMappedIA64GenReg (Ra);
Rc = translator->regMaps->getMappedIA64GenReg (Rc);
//Writes to the zero reg produce faults in IA64 but not in Alpha
if (Rc != GPRegZero)
{
    //rTemp1 = Ra * 4
    shladd (translator, &instr, PredRegZero, rTemp1, Ra, 2,
    GPRegZero);
    translator->addNativeInstruction (&instr);
    //Rc = rTemp1 + lit
    adds_i14 (translator, &instr, PredRegZero, Rc, lit, rTemp1);
    translator->addNativeInstruction (&instr);
}
return 0;
}
``` |

| IA-64 instruction generator functions for 'shladd' instruction. |
|---|
| ```
//****************************************************************
//****************************************************************
// This function generates type A2 instructions.
void genA2 (Translator *translator, NativeInstruction *inst, UINT64 x4,
    UINT64 qp, UINT64 r1, UINT64 r2, UINT64 ct2, UINT64 r3)
{
    inst->instr      = (8UL << 37) | (x4 << 29) | (ct2 << 27) |
                       (r1 << 6) | (r2 << 13) | (r3 << 20);
    inst->type       = ALU;
    translator->regMaps->getGenRegMask (inst->srcRegsUsed, r2, r3);
    inst->srcRegType = General;
    translator->regMaps->getGenRegMask (inst->destRegUsed, r1);
    inst->destRegType = General;
    inst->predReg    = translator->regMaps->getPredRegMask (qp);
}
void shladd (Translator *translator, NativeInstruction *inst, UINT64 gp,
    UINT64 r1, UINT64 r2. UINT64 count, UINT64 r3)
{
    //IA64 needs count to be 1 less than actual number of bits
    to be shifted
    count--;
    genA2 (translator, inst, 4, qp, r1, r2, count, r3);
}
``` |

It should also be noted that the register remapping function is handled by the legacy instruction translator functions as well. Another important note is that a single scratch register is required for the execution of this Alpha instruction on the IA-64.

Alpha CMOVEQ

The Alpha CMOVEQ instruction conditionally moves a value into an Alpha general register. The legacy instruction translator for this instruction can be found in the following example. This Alpha instruction once again requires two IA-64 instructions, cmp.eq (8-bit immediate form) and add (register form).

| Alpha CMOVEQ legacy instruction translator function. |
|---|
| ```
/*
* This function translates the Alpha instruction Conditional Move if
* Register Equal to Zero. If register Ra is equal to 0, Rb is written to Rc.
*/
INT64 CMOVEQ (Translator *translator, UINT64 Ra, UINT64 Rb,
UINT64 Rc)
{
    NativeInstruction instr;
``` |

| Alpha CMOVEQ legacy instruction translator function. |
|---|
| ```
    //Get the necessary temp registers
    UINT64 pTemp1 = translator->regMaps->getPredTempReg ( );
    UINT64 pTemp2 = translator->regMaps->getPredTempReg ( );
    //Get the mapped IA64 registers for the input Alpha registers
    Ra = translator->regMaps->getMappedIA64GenReg (Ra);
    Rb = translator->regMaps->getMappedIA64GenReg (Rb);
    Rc = translator->regMaps->getMappedIA64GenReg (Rc);
    //Writes to the zero reg produce faults in IA64 but not in Alpha
    if (Rc != GPRegZero)
    {
        // Determine if Ra is equal to zero
        cmp_eq_i8 (translator, &instr, PredRegZero, pTemp1,
        pTemp2, 0, Ra);
        translator->addNativeInstruction (&instr);
        // conditionally do the move
        add_r (translator, &instr, pTemp1, Rc, GPRegZero, Rb);
        translator->addNativeInstruction (&instr);
    }
    return 0;
}
``` |

Optimizer Example

IA-64 Code Scheduler Optimizer

Figure 10:
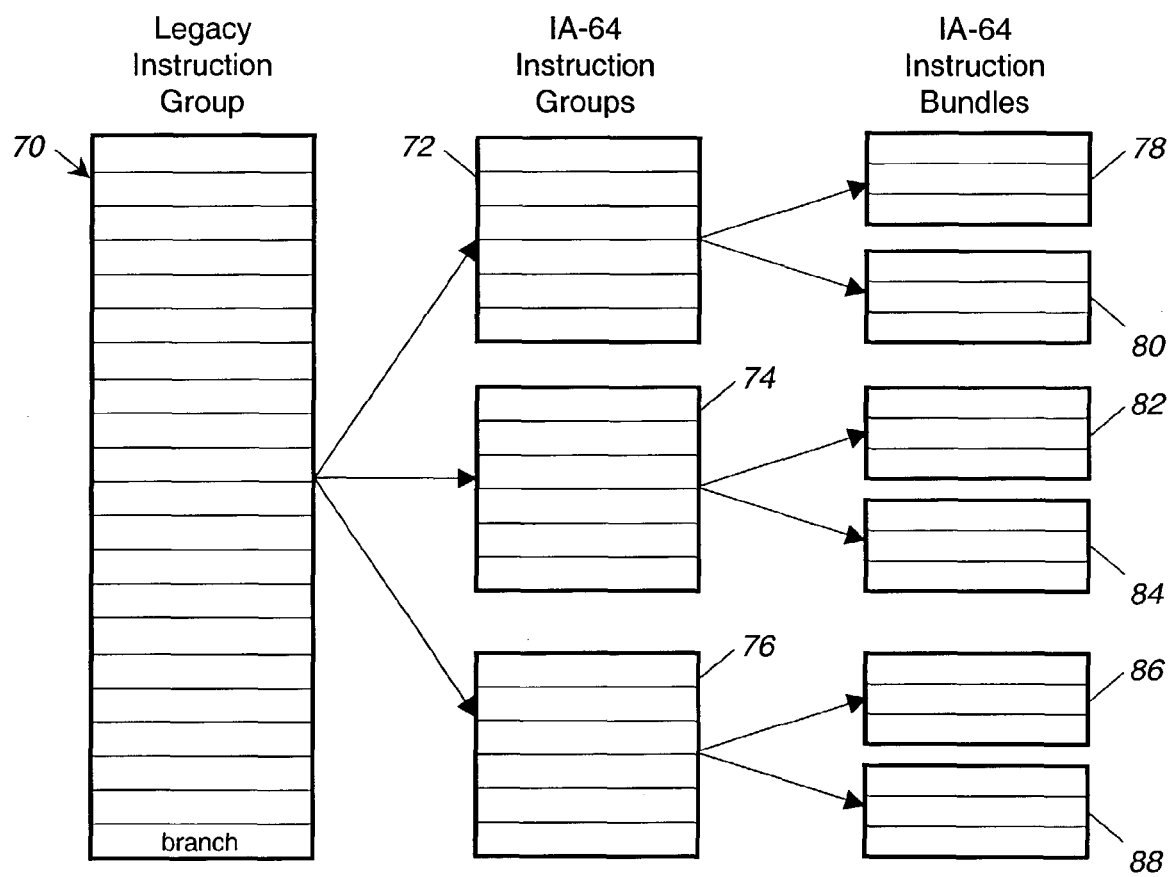
FIG. 10 is a block diagram of a scheduling optimizer for Intel IA-64 microprocessor in accordance with the present invention.

The following optimizer example takes advantage of the IA-64 EPIC architecture by attempting to optimally schedule translated instructions for maximum instruction parallelism. The Itanium 2 processor can execute up to 6 instructions per clock cycle. These instructions must be formed into instruction bundles of 3 41-bit instructions along with a 5-bit template field that indicates what processor resources are needed to execute the instructions. The optimizer analyzes native instructions to determine which ones can safely execute in parallel based on data dependencies and then selects instruction bundles to match those instruction groups. The overall process is shown in FIG. 10. The binary translator in accordance with the present invention breaks the legacy program down into legacy instruction groups 70. The IA-64 scheduling optimizer then breaks down the translated native equivalent instructions into IA-64 instruction groups 72, 74, 76. All instructions in an IA-64 instruction group can be safely executed simultaneously and, thus, contain no data dependencies amongst each other. The optimizer then breaks the IA-64 instruction groups 72, 74, 76 down into IA-64 instruction bundles 78, 80, 82, 84, 86 and 88 of 3 instructions each.

This scheduling algorithm applies only to Itanium 2 and later IA-64 processors. However, each native processor will likely benefit from a tailored instruction-scheduling algorithm suited to that architecture.

Figure 11:
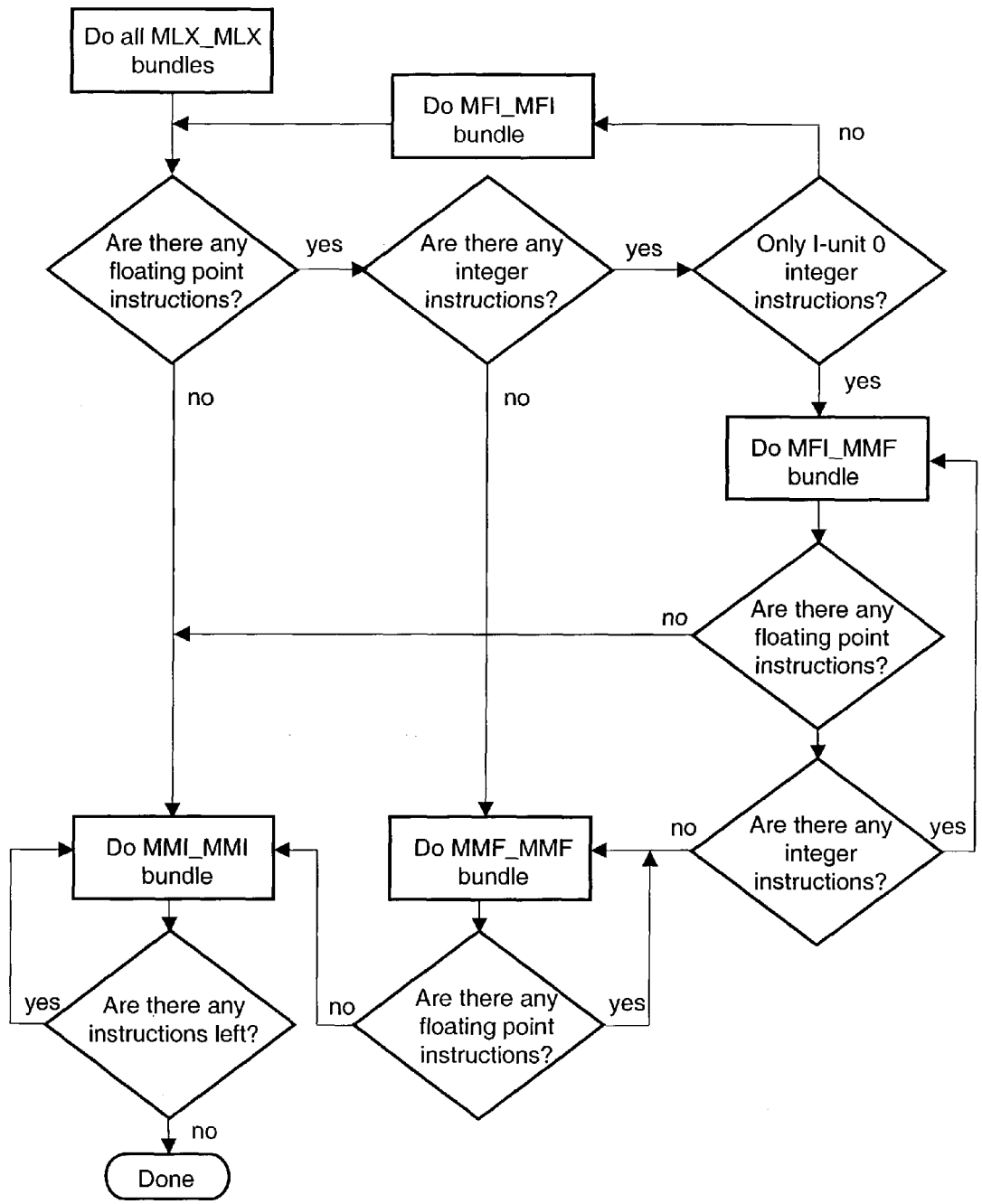
FIG. 11 is a flow diagram of an exemplary instruction scheduling optimizer algorithm in accordance with the present invention.

The IA-64 architecture defines a limited number of bundle types. Not all combinations of IA-64 instructions are valid within the same bundle. For instance, a common bundle type is identified as MMI, which indicates that two memory instructions and one integer instruction are contained in that bundle. The bundle types are encoded in the bundle's 5-bit template field. It is important to carefully choose bundle types to avoid processor stalls. To this end, the IA-64 scheduler optimizer uses a carefully designed algorithm to select bundle types for the IA-64 instructions within an instruction group. An exemplary algorithm is illustrated in FIG. 11.

Translation Process Example

The examples below are for an Alpha legacy processor and an IA-64 native processor. A group of four legacy Alpha instructions are converted to IA-64 instructions and properly organized for this native processor.

Figure 12:
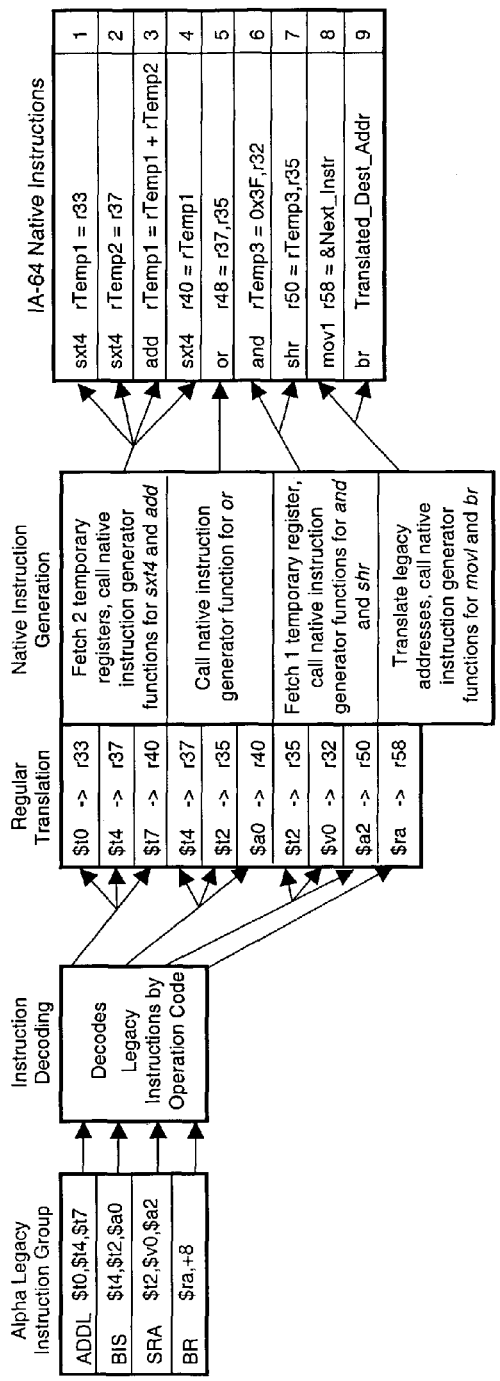
FIG. 12 is a block diagram illustrating an exemplary instruction translation of Alpha legacy binary instructions to Intel IA-64 native processor binary instructions.

FIG. 12 shows a graphical depiction of a small block of Alpha instructions and the process of translating them to IA-64 instructions. This figure shows only translation steps and no optimizations. Legacy code blocks always end with a flow control instruction of some kind, usually a jump or branch and are called legacy procedures (though they may not actually represent a complete legacy procedure in terms of the original source code). All the instructions in a legacy procedure execute sequentially. This example assumes the legacy program has already been broken down into legacy procedures and that the translation of a single procedure is occurring.

The translation process involves taking a single legacy instruction, decoding it using lookup tables based on the operation code (opcode) and invoking the proper legacy instruction translator function, which then constructs the native processor instructions as required. That process generally involves the following steps:

1. One or more temporary (scratch) registers may be needed. If this is the case, they are requested from the X-port object responsible for register mapping. A rotating set of temporary registers is used. For an IA-64 native processor, some of the IA-64's 128 general-purpose registers are dedicated for use as temporary registers.
2. All legacy registers used by the legacy instruction are mapped to their corresponding host processor registers. Again, the register mapping component of X-port performs this service.
3. Now that the registers are mapped and temporary registers are allocated, if needed, the legacy translator function calls native instruction generator functions to produce the host processor instructions in raw binary form. For this example, seven different IA-64 instructions are required (sxt4 is used three times) and, therefore, seven different native instruction generator functions are used.

The output of this process is a straight sequential set of native processor instructions that ultimately perform the same function as the legacy instructions. In FIG. 12, each resulting IA-64 host processor instruction is numbered for further reference. As can be seen for the Alpha instructions shown, nine IA-64 instructions are needed for proper emulation. The number can be more or less depending on the legacy instruction mix.

This set of instructions could be packaged and executed as is, but this would lead to poor performance on an IA-64 host processor. The following briefly describes how instruction packaging should be performed for this processor to enhance performance. Though this information is IA-64 specific, other host processors can and will require similar code reorganization to achieve maximum performance.

Figure 13:
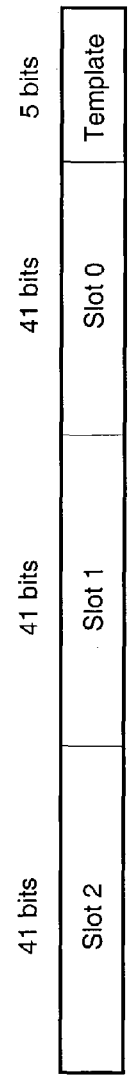
FIG. 13 illustrates the instruction bundle format for an Intel IA-64 native processor.

The IA-64 architecture requires that instructions be grouped into instruction bundles. The layout of an instruction bundle can be seen in FIG. 13. Each bundle consists of three IA-64 instructions, each of which is 41 bits in length. The bundle also contains a 5-bit template field, which is used to describe the processor resources required by that set of three instructions. These resources are processor execution units.

Figure 14:
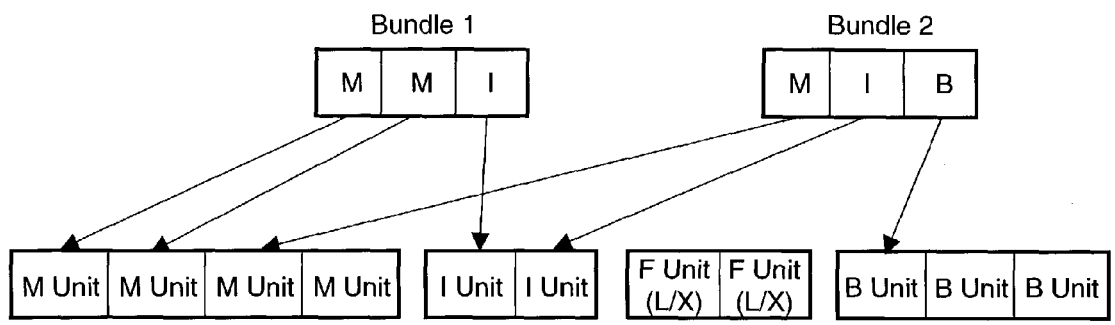
FIG. 14 illustrates the execution unit format of a type Itanium 2 processor.

FIG. 14 shows the execution units available in an Itanium 2 processor. These include four memory units (which can also execute many simple integer and logical instructions), two integer units, two floating-point units (which also execute long or extended instructions) and three branch units. The figure also shows how those resources might be used for a set of two instruction bundles. This will be further described below. It should be noted that an IA-64 processor is able to execute two full instruction bundles (six instructions) at a time if adequate processor resources are available.

The template field of a bundle specifies which combination of execution units are needed by the instructions within the bundle. For instance, a template field value of 16 represents the code MIB, which means that a memory unit, an integer unit, and a branch unit are required. A template field can also specify a stop condition, which means that all currently executing instructions must complete before any new instructions are accepted by the processor. Stops are used to prevent data dependency violations. Template type 17 is also an MIB type but also specifies a stop at the end of the bundle. It is indicated by the notation MIB_.

The term IA-64 instruction group refers to a group of IA-64 instructions that are all eligible for parallel execution. An IA-64 instruction group is ultimately organized into one or more instruction bundles the last of which must contain a stop.

Figure 15:
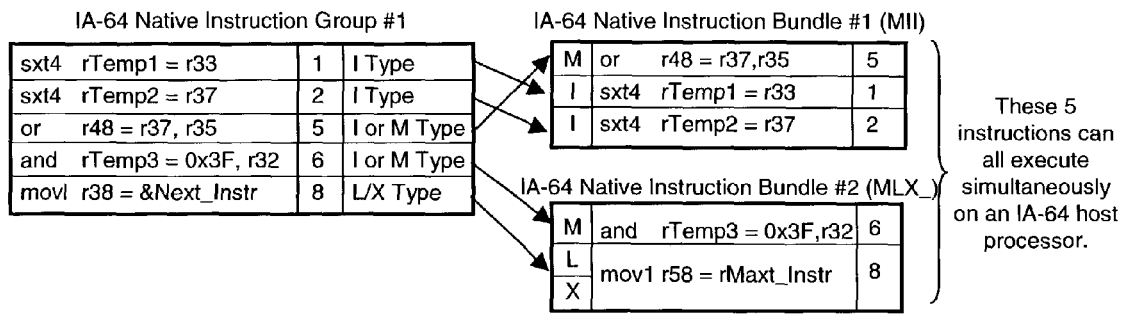
FIG. 15 illustrates how translated IA-64 native processor instructions are organized into IA-64 instruction bundles for the first of two IA-64 instruction groups.

Using this information about the IA-64 host architecture, the next step of the translation process can be examined. FIG. 15 shows the next step for an IA-64 host processor.

FIG. 15 shows a set of instructions from FIG. 12 that contain no data dependencies among each other. This is a single IA-64 instruction group.

A requirement for good performance of an IA-64 host processor is that instructions are properly scheduled for maximum parallelism in an order that does not allow for data dependency violations. Thus, the IA-64 specific portion of X-port performs analysis of the instruction stream emitted in FIG. 12, and determines what instructions can be safely executed simultaneously. In FIG. 15 it can be seen that instructions 1, 2, 5, 6, and 8 have no register dependencies between them and, therefore, can be safely executed in parallel. However, this is a list of five instructions. IA-64 instruction bundles must be chosen to contain these instructions. The resulting instruction bundles are then committed to memory as a portion of the executable IA-64 code. It should be noted that the IA-64 movl instruction requires two bundle slots.

Figures 16, 17:
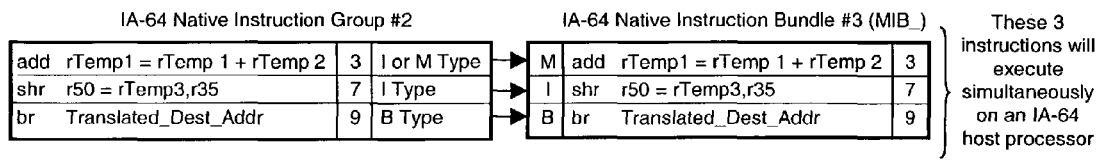
FIG. 16 is similar to FIG. 15 but illustrates the process for the second of two IA-64 instruction groups.
FIG. 17 illustrates a branch prediction optimization example in accordance with the present invention.

FIG. 16 shows the second IA-64 instruction group, which contains just three instructions (3, 7, and 9). This IA-64 instruction group will fit into a single bundle of type MIB. Though it did not occur in this example, it is possible that all of an instruction bundle cannot be filled. In these cases, no-operation codes can be inserted into any bundle slot to complete a bundle. The construction of IA-64 instruction bundles represents the end of the process. Once in this form, IA-64 instructions are directly executable by the host processor.

Post-Translation Optimization Example

Following is an example of an optimizer that may be invoked after translation occurs. The example assumes an Alpha legacy processor and an IA-64 native processor. Its purpose is to eliminate short forward branches using a feature of the IA-64 host processor called predication. Predication allows for conditionally executing one or more instructions.

The example below shows a simple C language if-then construct to illustrate a reason for using the IA-64 predication feature. (The register r5 is assumed to be a, r6 to be b, and r7 to be c.) As can be seen, the variable c will take on the value 0 if a is greater than b. Otherwise, c will be set equal to 1. This kind of statement can be represented in assembly language as seen in the figure.

| Simple if-then statement in C with assembly equivalents. |
| --- |

```
                   if (a > b)
                   {
                       c = 0;
                   }
                   else
                   {
                       c = 1;
                   }
// PowerPC implementation--a conditional branch and an unconditional
// branch are required
        cmpgt      r5,r6       // compare 'a' and 'b'
        beq        a_gt_b      // jump if true
        li         r7,1        // c = 1 (false case)
        b          done
a_gt_b: li         r7,0        // c = 0 (true case)
done:                          // continue executing here
// IA-64 implementation--no branches required
        cmp.gt     p1,p2 = r5,r6  // compare 'a' and 'b'
(p1)    mov        r7 = 0      // if a > b, c = 0
(p2)    mov        r7 = 1      // else, c = 1
```

Most modern microprocessor architectures will require one or more branches to be used to conditionally set the value of c. The IA-64 implementation does not, however, due to predication. The IA-64 cmp.gt instruction compares r5 and r6 and stores a true or false (1 or 0) value into the predicate registers p1 and p2. The results in those registers are used to conditionally execute the next two instructions. The first mov executes only if p1=1. The second mov executes only if p2=1. Since the given compare instruction returns the true or false result of the compare in p1 and the complement of the result into p2, only one of the mov instructions is effective. The other does not execute.

This concept can be used to eliminate short forward conditional branches. FIG. 17 shows a small piece of Alpha code that contains a short forward conditional branch instruction (BEQ). If the branch is taken at address 100C, the instructions at 1010 and 1014 will not execute. If the branch condition is not satisfied, the branch will fall through and they will execute.

As is indicated by the figure, the BEQ instruction can be replaced with an IA-64 compare instruction that stores its results into IA-64 predicate registers. These predicate registers can then be used to conditionally execute the IA-64 equivalent code for the Alpha ORNOT and ADDQ instructions, eliminating an unnecessary conditional branch. This is beneficial since modern microprocessors attempt to pre-fetch instructions along what they believe is the correct instruction path. If the processor mispredicts whether the conditional branch is taken or not, a performance penalty is paid since mispredicted instructions already in the processor's pipeline (s) must be flushed and instructions along the alternate path must be fetched for execution. For these reasons, it is usually desirable to eliminate conditional branches whenever possible.

This optimizer example is one that is able to take advantage of a native processor feature not present in the legacy processor.

The optimization module searches the translated legacy code (the resulting IA-64 code) looking for short forward conditional branches. As it finds them, it eliminates the branch, generates IA-64 binary code for the compare, and modifies the instructions to be predicated. This process occurs after translation but before the native instructions are committed to memory for execution. Thus, it is still possible to modify their behavior.

Pre-Translation Optimization Example

Following is an example of pre-translation optimization. It allows for performing function inlining. Inlining is a compiler technique which expands the contents of a function "in line" rather than setting up to jump to the function itself. Functions that are suitable for inlining are generally small and do not often call other functions. The disadvantage of function inlining is that the code for the function is duplicated everywhere it is called. This increases the memory requirements of the program. A modern native processor, such as the IA-64, however, may contain several gigabytes of random access memory. For such a processor, the memory penalty of function inlining is not even noticeable.

The following example shows a small C language code example. Here, funcX calls funcY, which performs a very simple operation. An optimizing compiler may choose to inline funcY depending on the optimizations selected by the programmer.

| A C function calling a small C function. |
| --- |

```
int funcX (int a)
{
    funcY (a);        // call funcY
}
int funcY (int b)
{
    return b + 7;
}
```

The binary translator in accordance with the present invention, on the other hand, may be able to select a much broader range of functions for inlining sacrificing memory usage for speed. For each inlined function, the following portions of legacy code can be omitted:

1. Setup code: Usually there is a certain amount of setup required to perform a function call. This is probably in the area of up to six legacy instructions but can vary from platform to platform.
2. Unconditional Branch: A 'jump' instruction vectors code execution to the function being called.
3. Function Preamble: Generally, functions contain a preamble of some kind, which usually consists of a few instructions. Operations performed in the preamble include setting up global pointers to data areas.
4. Function Return: Returning from a function generally involves a few cleanup instructions.
5. Unconditional Branch: A 'return' instruction vectors code execution back to the calling function.

Inlining a function can, in many cases, result in increased performance due to the amount of legacy code that can be eliminated.

This optimizer works on the legacy code before it has been translated but after it has been grouped. It searches for function calls and inserts hints for the binary translation system when it finds a valid function for inlining.

This optimization is not specific to the capabilities of the IA-64 host processor other than having abundant memory to make inlining more feasible than for the original legacy system.

Obviously, many modifications and variations of the present invention are possible in light of the above teachings. Thus, it is to be understood that, within the scope of the appended claims, the invention may be practiced otherwise than as specifically described above.

What is claimed and desired to be covered by a Letters Patent is as follows:

1. A binary translator comprising:
   a loader subsystem for reading and loading legacy binary instructions into a file; and
   a legacy instruction processor subsystem for reading said legacy binary instructions and grouping the legacy instructions into groups that end in flow control instructions defining legacy procedures;
   a translator subsystem for receiving legacy procedures by translating said legacy binary instructions that form part of said legacy procedures by mapping said legacy instructions to legacy instruction handlers during a first pass that allows multiple instructions in a legacy procedure to be translated into native instructions in parallel and translating said flow control instructions in a second pass thereby creating a translated legacy code stream and
   a thunk manager for adding new native binary instructions to said translated legacy code stream.

2. The system as recited in claim 1, wherein said translator subsystem includes a legacy instruction processor subsystem, an instruction processor subsystem and a native instruction processor subsystem.

3. The binary translator as recited in claim 2, wherein said legacy instruction processor subsystem is a modular subsystem and is reconfigurable to provide compatibility with different legacy processors.

4. The binary translator as recited in claim 2, wherein said legacy instruction processor subsystem is configured to disable selected legacy instructions.

5. The binary translator as recited in claim 4, wherein said native instruction processor subsystem is configured to replace disabled legacy instructions with native instructions.

6. The binary translator as recited in claim 2, wherein said native instruction processor subsystem is configured to be independent of the legacy processor.

7. The binary translator as recited in claim 6, wherein said native instruction processor subsystem is configured to enable legacy binary instructions to be executed on different native processors.

8. A binary translator comprising:
   a loader subsystem for reading and loading legacy binary instructions into a file;
   a legacy instruction processor subsystem for reading said legacy binary instructions and grouping the legacy instructions into groups that end in flow control instructions defining legacy procedures;
   a translator subsystem for receiving legacy procedures by translating said legacy binary instructions that form part of said legacy procedures by mapping said legacy instructions to legacy instruction handlers during a first pass that allows multiple instructions in a legacy procedure to be translated into native instructions in parallel and translating said flow control instructions in a second pass thereby creating a translated legacy code stream and
   a thunk manager for locating thunk objects inserted into said translated legacy code stream and transferring control to a thunk object handler by way of a vector processing said thunk object and vectoring back to said translated legacy code stream in order to add new native code to said translated legacy code stream that adds new features not included with said legacy code without modifying said legacy binary.

* * * * *